United States Patent
Ehrenfried, Sr.

(10) Patent No.: US 6,793,040 B2
(45) Date of Patent: Sep. 21, 2004

(54) STAND FOR MOUNTING ON AND ORBITING ABOUT COLUMNAR MEMBER

(76) Inventor: Barry A. Ehrenfried, Sr., 119 Kitty Dr., Grafton, VA (US) 23692

( * ) Notice: Subject to any disclaimer, the term of this patent is extended or adjusted under 35 U.S.C. 154(b) by 0 days.

(21) Appl. No.: 10/277,499

(22) Filed: Oct. 22, 2002

(65) Prior Publication Data

US 2004/0074699 A1 Apr. 22, 2004

(51) Int. Cl.[7] .............................................. E04G 3/00
(52) U.S. Cl. ....................... 182/187; 182/135; 182/136; 182/188; 108/152; 248/218.4
(58) Field of Search ................................ 182/135, 136, 182/187, 188; 108/152; 248/218.4; 11/11

(56) References Cited

U.S. PATENT DOCUMENTS

| | | | | |
|---|---|---|---|---|
| 151,285 A | * | 8/1874 | Keegan et al. | 297/256.13 |
| 209,388 A | * | 11/1878 | Arsenault et al. | |
| 4,352,218 A | * | 10/1982 | Lundberg | 114/363 |
| 4,768,775 A | * | 9/1988 | Marshall | 272/72 |
| 4,953,662 A | * | 9/1990 | Porter | 182/135 |
| 5,641,036 A | * | 6/1997 | Maxwell | 182/135 |
| 5,669,324 A | * | 9/1997 | Muir, III | 114/194 |
| 5,872,321 A | * | 2/1999 | Yannaccone | 73/865.3 |
| 5,996,738 A | * | 12/1999 | Nelsen | 182/135 |
| 6,494,145 B2 | * | 12/2002 | Kernan | 105/149.1 |
| 6,510,922 B1 | * | 1/2003 | Hodnett | 182/187 |
| 6,588,546 B1 | * | 7/2003 | Forrest | 182/135 |
| 6,622,823 B2 | * | 9/2003 | Engstrom | 182/136 |

FOREIGN PATENT DOCUMENTS

DE 19715301 * 10/1998 ............. 182/187 X

* cited by examiner

Primary Examiner—Bruce A. Lev
(74) Attorney, Agent, or Firm—Peter J. Van Bergen

(57) ABSTRACT

A stand includes a track mounted to a columnar member such as a tree trunk. The track substantially or completely encircles the columnar member. A seat is mounted to the track for movement thereon. A platform is mounted to the columnar member beneath the seat. The seat and platform are designed to move in concert with one another about the columnar member by a user sitting on the seat with his feet resting on the platform.

21 Claims, 6 Drawing Sheets

US 6,793,040 B2

STAND FOR MOUNTING ON AND ORBITING ABOUT COLUMNAR MEMBER

FIELD OF THE INVENTION

The invention relates generally to stands that mount to columnar members such as trees or poles, and more particularly to a stand that mounts on and can orbit 360° about the columnar member to which it is mounted while a user is sitting on the stand.

BACKGROUND OF THE INVENTION

Hunters use tree stands to position themselves at an elevated position on a tree. These stands can be semi-permanently constructed and attached to a tree. Portable tree stands have also been developed for attachment to a tree trunk only when one is hunting. Such portable tree stands are typically configured to "climb" a tree's trunk. As is well known in the art, climbing tree stands generally have an upper member and a lower member that are used together to climb the tree and that provide a sitting and standing support, respectively, once a desired elevation is achieved.

The problem with existing tree stands is a hunter's field of view and/or shooting angle is limited to the position of the stand's sitting and standing supports, and/or the position that the hunter can contort his body. Further, in an effort to see or shoot at extreme angles, the hunter could loose his balance and fall from the tree stand. While some portable tree stands provide a rotatable seat, the seat's position is still fixed relative to the tree so that the tree trunk (to which the stand is mounted) can still obscure a hunter's view and/or shooting angle when the seat is pivoted towards the tree trunk. Thus, once again, the hunter may have to contort his body in a manner that makes him vulnerable to losing his balance leading to a bad shot or a fall from the tree stand.

SUMMARY OF THE INVENTION

Accordingly, it is an object of the present invention to provide a stand for mounting to a columnar member such as a tree trunk.

Another object of the present invention is to provide a stand that can orbit about a columnar member to which it is mounted.

Still another object of the present invention is to provide a portable stand that can be used to climb a columnar member, mount to the columnar member at a desired elevation, and orbit about the columnar member under the control of a user supported by the stand.

Other objects and advantages of the present invention will become more obvious hereinafter in the specification and drawings.

In accordance with the present invention, a stand is provided for use with a columnar member such as a pole or a tree. A track is mounted to the columnar member such that the track at least substantially encircles the columnar member. A seat is mounted to the track for movement thereon. A platform is mounted to the columnar member beneath the seat. The platform's mounting is such that it prevents movement thereof about the columnar member when a downward force is applied to the platform, and allows movement thereof about the columnar member when a lifting force is applied to the platform. The seat and platform are moved in concert with one another about the columnar member by a user sitting on the seat with his feet resting on the platform. Each of the track's mounting and platform's mounting can be constructed for climbing the columnar member.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
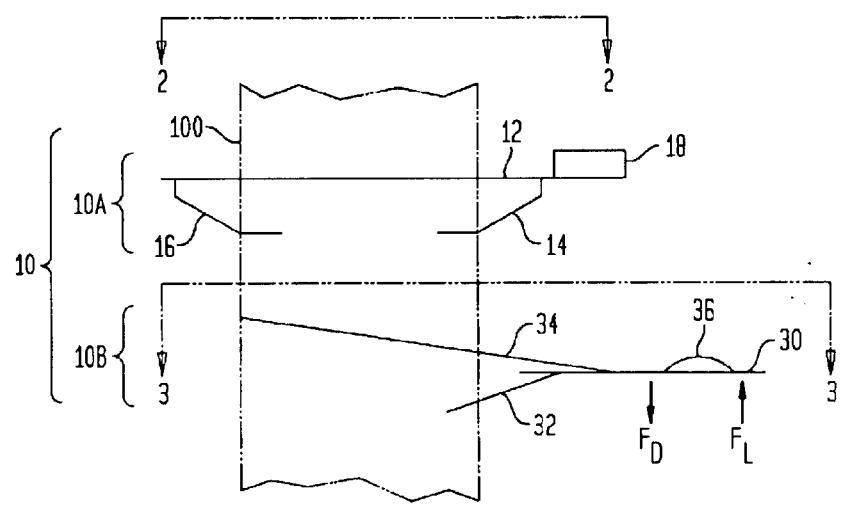
FIG. 1 is a schematic view of a stand that mounts to a columnar member and provides the user the capability to orbit about the columnar member in accordance with the present invention.
Figure 2:
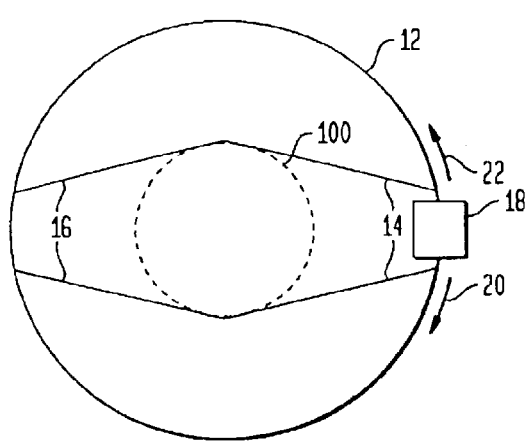
FIG. 2 is an isolated top view of the track and seat portion of the stand taken along line 2—2 in FIG. 1.
Figure 3:
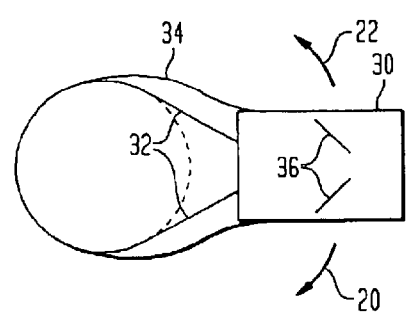
FIG. 3 is a top view of the platform/footrest portion of the stand taken along line 3—3 in FIG. 1.

Referring now to the drawings, simultaneous reference will be made to FIGS. 1–3 where FIG. 1 illustrates a stand 10 of the present invention in a side view, FIG. 2 illustrates a top view of the track and seat portion of the stand, and FIG. 3 illustrates a top view of the platform/footrest portion of the stand. In each view, the stand or portions thereof are mounted to a columnar member 100 (e.g., a tree trunk, a pole, etc.) shown using phantom lines. Such mounting can be permanent or, as will be explained further below, can be temporary if the stand is to be portable.

An upper portion 10A of stand 10 includes a track 12 that substantially or completely encircles columnar member 100. Since stand 10 offers the user the greatest amount of flexibility and adjustability if track 12 is continuous to completely encircle columnar member 100, the remainder of the description will assume that track 12 is continuous. While track 12 can be circular as shown, its shape is not so limited. Ovals or other continuous shapes can be used for track 12 without departing from the scope of the present invention. In addition, track 12 can be made from two or more sections that are jointed together to form track 12.

Track 12 is supported about columnar member 100 by mounting brackets or frames 14 and 16 disposed on opposing sides of columnar member 100. Each of frames 14 and 16 is coupled to track 12 and is designed to grip columnar member 100 to rigidly maintain track 12 at its desired elevation on columnar member 100. While the particular design of frames 14 and 16 can be varied without departing from the scope of the present invention, a specific design of frames 14 and 16 will be described further below if stand 10 is to be a portable "climbing" stand. In such a case, half of track 12 could be coupled to frame 14 and the other half could be coupled to frame 16. The track halves would be joined together when frames 14 and 16 are disposed on opposing sides of columnar member 100.

Figure 4A:
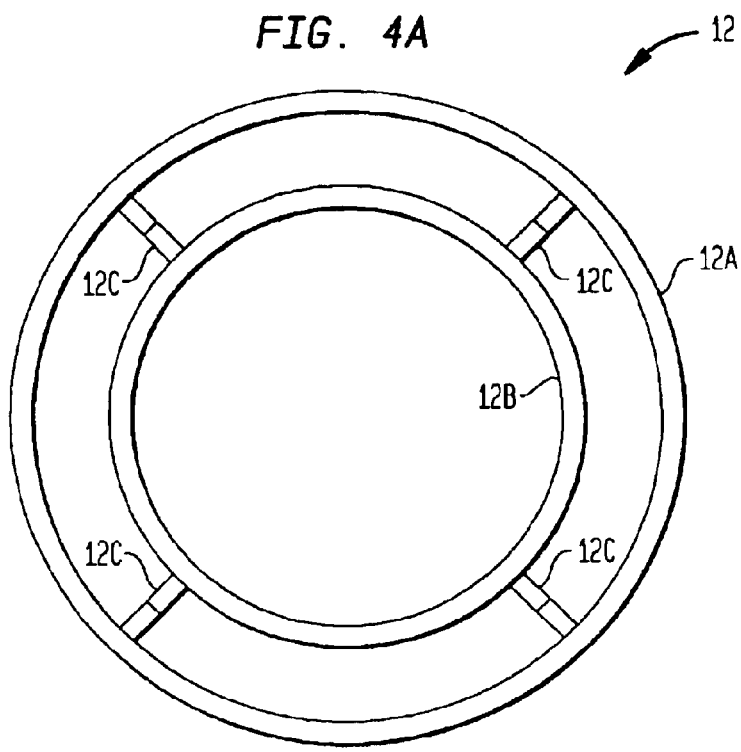
FIG. 4A is a top view of one embodiment of a track using parallel rails.
Figure 4B:
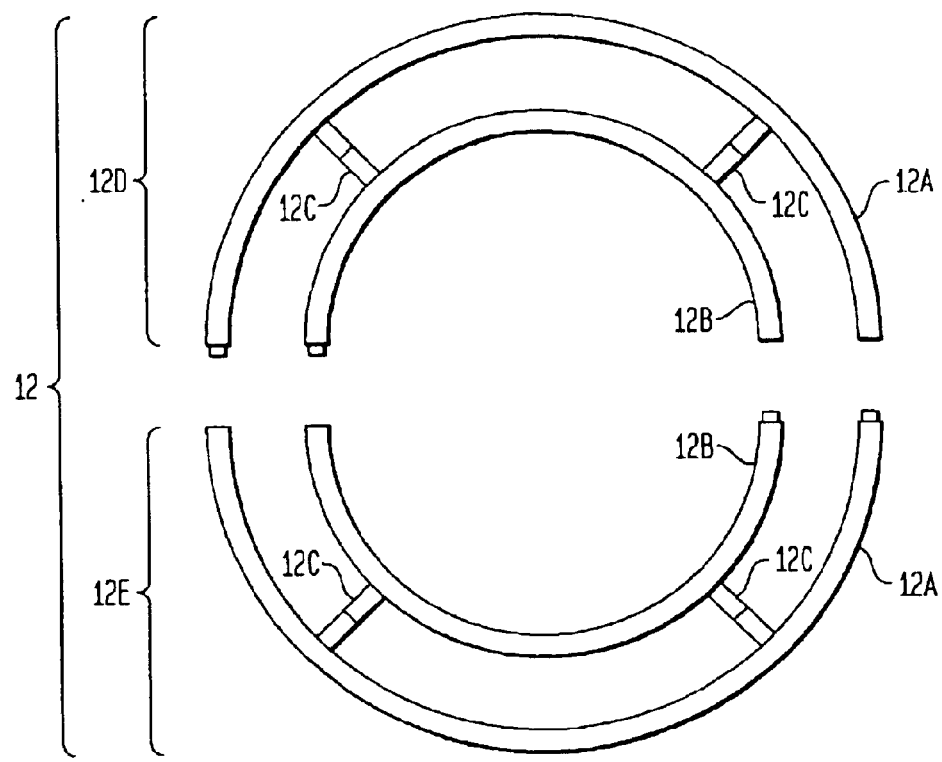
FIG. 4B is a top view of another embodiment of a track using parallel rails in which the track is made from a plurality of joinable track sections.
Figure 5:
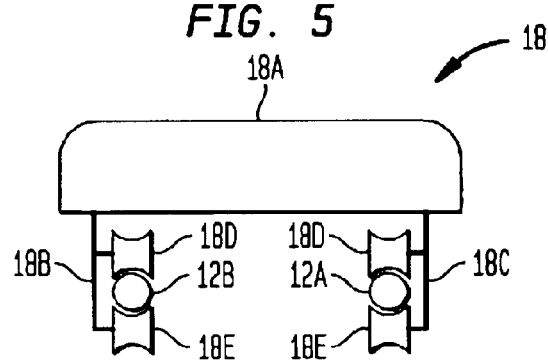
FIG. 5 is a side of an embodiment of a seat for use with the parallel rail track shown in FIGS. 4A and 4B.

Supported on track 12 is a seat 18 that is able to move along track 12 in either direction as indicated by arrows 20 and 22 (FIG. 2). The particular type of mounting used to couple seat 18 to track 12 (for movement thereon) is not a limitation of the present invention. For example, contact with track 12 can be made using wheels, slides or other suitable bearing surfaces well known to one of ordinary skill in the art. As will be explained further below, seat 18 must support the sitting weight of a user. Accordingly, seat 18 should provide a stable surface. One way of achieving this is to construct track 12 using a pair of parallel rails. More specifically, as shown in FIG. 4A, track 12 can be constructed from a parallel rails 12A and 12B fixedly coupled to one another to maintain their parallel relationship by braces 12C. As mentioned above and as shown in FIG. 4B, track 12 could also be made from track sections 12D and 12E that are joined together after being placed about a columnar member. With a track constructed as shown in either of FIGS. 4A and 4B, seat 18 can be constructed as shown in FIG. 5. Seat 18 includes a cushion seat 18A having two supports 18B and 18C extending downward therefrom. Each of supports 18B and 18C has roller wheels 18D and 18E depending therefrom for engaging the upper and lower portions, respectively, of parallel rails 12A and 12B.

Mounted to columnar member 100 beneath track 12 is a lower portion 10B of stand 10 which includes a platform/footrest 30 (FIGS. 1 and 3) positioned beneath seat 18 by means of braces 32 and a band 34. Braces 32 are rigidly coupled to platform/footrest 30 and form a V-shape that engages either side of columnar member 100. Band 34 is coupled to either side of platform/footrest 30 and is wrapped about columnar member 100 above the point at which braces 32 engage columnar member 100. If a downward force $F_D$ is applied to platform/footrest 30, braces 32 engage columnar member 100 while band 34 is tensioned about columnar member 100. However, if an upward or lifting force $F_L$ is applied to platform/footrest 30, braces 32 pivot downward and away from columnar member 100 while the tension in band 34 is relaxed. When this occurs, platform/footrest 30 can orbit about columnar member 100 in either of directions 20 or 22.

In operation of stand 10 positioned on columnar member 100 as shown, a user is seated on seat 18 with his feet resting on platform/footrest 30. To orbit about columnar member 100, the user must apply lifting force $F_L$ to platform/footrest 30 and simultaneously shift seat 18 and platform/footrest 30 in either of directions 20 or 22. To facilitate the application of lifting force $F_L$, platform/footrest 30 is provided with means for engaging the user's feet. For example, foot stirrups 36 can be attached to platform/footrest 30 so that a user can slip his toes and forefoot underneath same. Lifting of one's feet will thus generate the necessary lifting force $F_L$ when desired.

Figure 6:
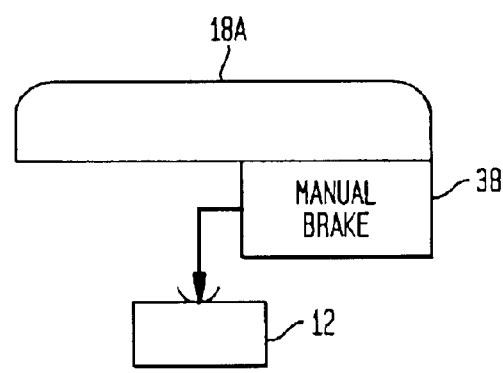
FIG. 6 is a schematic view of a seat equipped with a user-operated, track-engaging brake.
Figure 7:
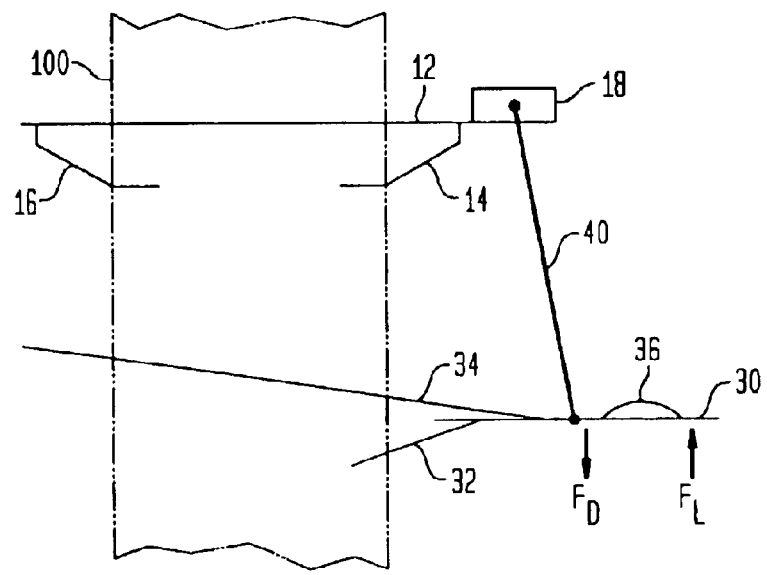
FIG. 7 is a schematic side view of an embodiment of the stand in which the seat and platform/footrest are coupled to one another for purposes of braking the seat on track.

Once the user has attained the desired orbital position relative to columnar member 100, the position is maintained generally by the user allowing his feet to rest on platform/footrest 30 to thereby apply downward force $F_D$ while the user is sitting on seat 18 with his feet on platform/footrest 30. However, since seat 18 is still free to move on track 12, it may be desirable to lock seat 18 into its position on track 12. This can be accomplished in a variety of ways. For example, as shown in FIG. 6, a brake 38 can be provided on seat 18 for engaging track 12 (e.g., a single or monorail track, one or both of rails 12A and 12B, etc.). Brake 38 could be manually engaged/disengaged by the user. A variety of brake designs can be used without departing from the scope of the present invention. Additionally or alternatively, "braking" of seat 18 can be accomplished by tethering seat 18 to platform/footrest 30. More specifically, FIG. 7 illustrates a tether 40 coupling seat 18 to platform/footrest 30. Note that more than one tether 40 can be used without departing from the scope of the present invention. Thus, when downward force $F_D$ is applied to platform/footrest 30, the tension in tether 40 locks seat 18 into its position on track 12. However, when a user applies lifting force $F_L$, the tension in tether 40 is relaxed so that seat 18 and lower portion 10B of stand 10 can orbit together about columnar member 100.

Figure 8:
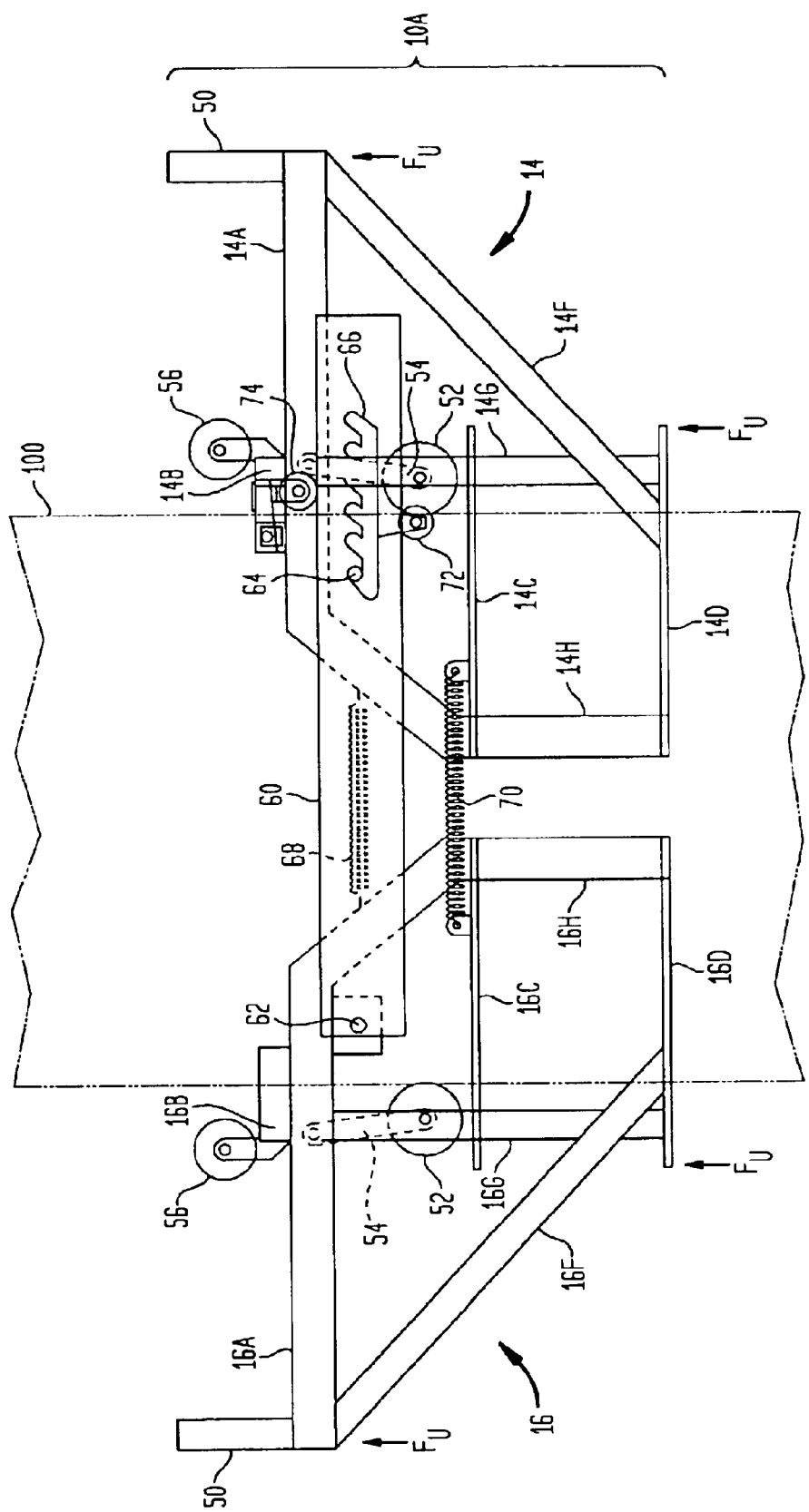
FIG. 8 is a side view of an embodiment of the upper portion of the stand configured for climbing up a columnar member.

As mentioned above, the stand of the present invention can be constructed as a portable climbing stand that is used to climb a columnar member during the process of positioning the stand at a desired elevation. Referring now to FIG. 8, upper portion 10A of the stand constructed for climbing and gripping columnar member 100 is shown in isolation. Note that the track (i.e., track 12) is not illustrated in this view for clarity of illustration, but would be mounted atop supports 50 (only two of which are shown). Each of supports 50 can incorporate a height adjustment feature (not shown) so that the track can be leveled when it is mounted thereon. Level indicators (not shown) can be provided on the track itself or could be incorporated on the seat (e.g., seat 18 which is not shown in FIG. 8)

In general, rigid frames 14 and 16 are positioned on either side of columnar member 100 and are coupled to and biased towards one another. Such coupling of rigid frames 14 and 16 is accomplished after their placement on opposing sides of columnar member 100. Each of frames 14 and 16 is constructed from a number of identical or very similar frame members. Accordingly, only a description of frame 14 will be provided herein, although corresponding reference numerals are shown for frame 16. To aid in the description of frames 14 and 16, simultaneously reference will be made to FIG. 9 where a top view of the upper portion is illustrated.

Frame 14 includes a perimeter member 14A, a cross-bracing member 14B spanning perimeter member 14A, two V-shaped bearing members 14C and 14D spanning across frame 14 and defining two bearing points that bear against columnar member 100, a track support member 14E spanning from perimeter member 14A to cross-bracing member 14B and serving as a platform for one of supports 50, and vertical support members 14F, 14G and 14H. The rigidity of the entirety of frame 14 is provided by the rigid coupling of the various frame members to one another. It is to be understood that the detailed construction of frame 14 can be changed in a variety of ways without departing from the scope of the present invention.

Coupled to each of cross-bracing members 14B and 16B are two spaced-apart bearing wheels 52, each of which is biased to bear against columnar member 100. More specifically, each wheel 52 is coupled to one of cross-bracing members 14B and 16B by means of a pivot arm 54 that is spring-biased towards columnar member 100. Also coupled to each of cross-bracing members 14B and 16B is a guide wheel 56 that is spaced apart from columnar member 100 when the upper portion of the stand is positioned thereon. As will be explained further below, each guide wheel 56 will bear against columnar member 100 when the stand is being maneuvered up or down on columnar member 100.

Once frames 14 and 16 are positioned either side of columnar member 100, they are coupled to and biased towards one another so that bearing members 14C, 14D, 16C and 16D bearing columnar member 100. More specifically, a coupling plate 60 is attached to perimeter member 16A at a pivot coupling 62, and is attached to perimeter member 14A at a pivot coupling 64. Each of pivot couplings 62 and 64 allows respective frames 14 and 16 to pivot thereabout in the plane of the paper as will be explained further below. To accommodate a variety of diameters of columnar member 100, plate 60 incorporates a notched track 66 where pivot coupling 64 engages one of the notches in track 66 based on the diameter of columnar member 100.

To bias frames 14 and 16 towards one another to thereby cause bearing members 14C, 14D, 16C and 16D to engage columnar member 100, an upper spring 68 is coupled between vertical support members 14H and 16H, while a lower spring 70 couples bearing members 14C and 16C. When it is desired to reposition upper portion 10A vertically on columnar member 100, a user applies and upward force $F_U$ at, for example, the central portion of each of perimeter members 14A and 16A or bearing members 14D and 16D as shown in FIG. 8. Upward force $F_U$ causes frames 14 and 16 to pivot (in the plane of the paper in FIG. 8) about respective pivot points 62 and 64. During this pivoting action, bearing members 14C, 14D, 16C and 16D are disengaged from columnar member 100 while bearing wheels 52 remain in contact therewith. The full extent of the pivoting action is reached when guide wheels 56 engage columnar member 100. At this point, continued application of upward force $F_U$ pushes upper portion up on columnar member 100 as wheels 52 and 56 ride therealong. Downward movement of upper portion 10A on columnar member 100 is achieved by applying a sufficient upward force $F_U$ to disengage bearing members 14C, 14D, 16C and 16D from columnar member 100, and then allowing upper portion 10A to "roll" down columnar member 100. When a desired height is reached, upward force $F_U$ is removed and bearing members 14C, 14D, 16C and 16D will again engage columnar member 100 as springs 68 and 70 act to return upper portion 10A to the position in FIG. 8.

Upper portion 10A automatically adjusts to changing diameter of columnar member 100 since the pivoting action brought on by upward force $F_U$ causes pivot coupling 64 to disengage from one of the notches in track 66. As a result, spring 68 and 70 draw frame 16 closer to frame 14 when the diameter of columnar member 100 decreases. However, if the diameter of columnar member 100 increases, bearing wheels 52 (which ride against columnar member 100) will cause frames 14 and 16 to spread further apart.

When upper portion 10A is being raised or lowered on columnar member 100, pivot coupling 64 must stay out of (i.e., remain below) the notched area of track 66. Conversely, when upper portion 10A is positioned at a particular height on columnar member 100 as shown in FIG. 8), pivot coupling 64 must remain in one of the notches in track 66. To insure each of these conditions, spring-loaded tracking wheels engage plate 60 above and below track 66. More specifically, a lower tracking wheel 72 is spring-biased against the lower portion of plate 60 to insure the pivot coupling 64 stays out of the notched area of track 66 when upper portion 10A is being moved up or down. An upper tracking wheel 74 is spring biased against the upper portion of plate 60 to insure that pivot coupling 64 remains in one of the notches in track 66 when upper portion 10A is at a selected height.

Figure 9:
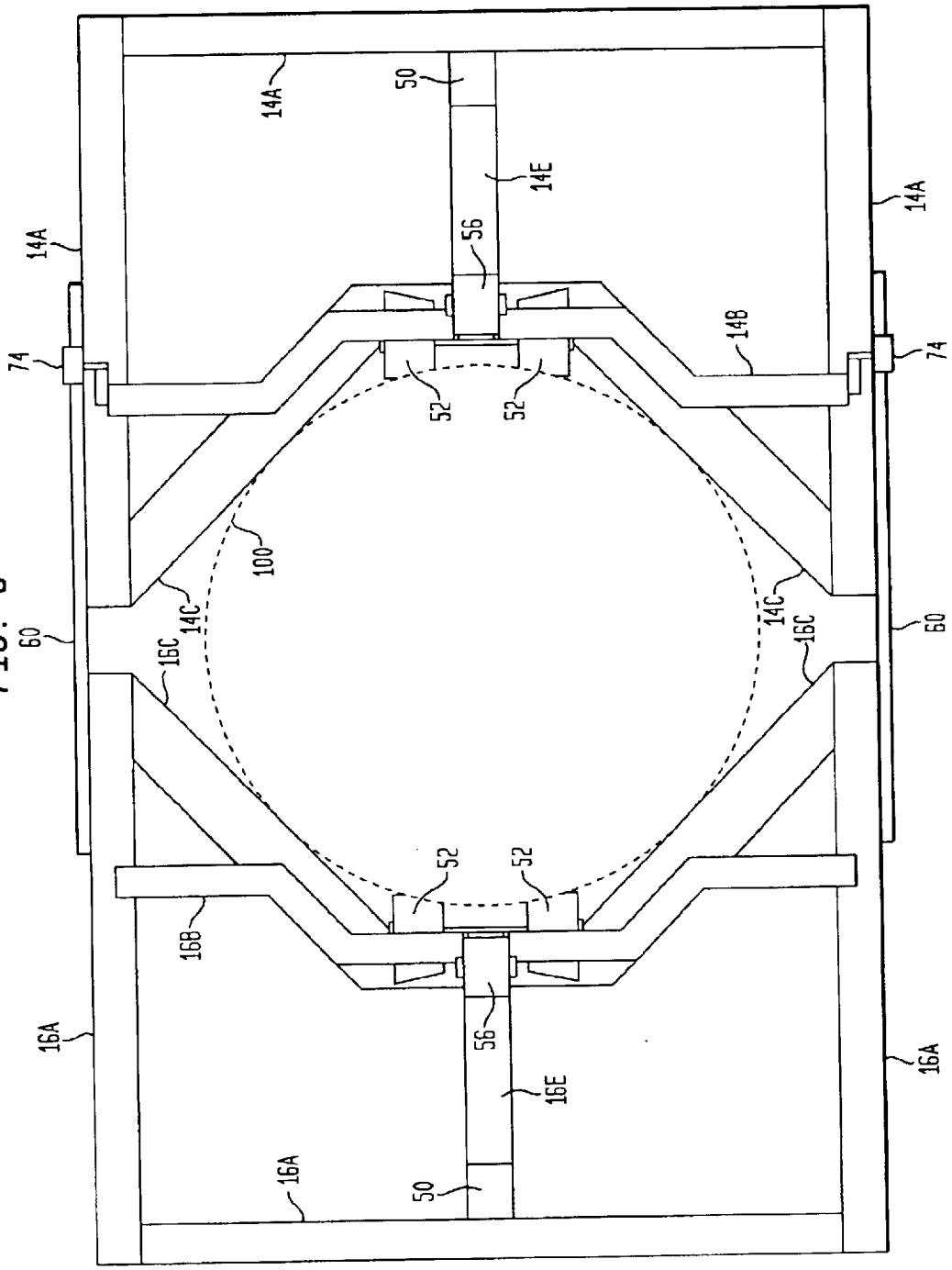
FIG. 9 is a top view of the upper portion of the stand taken along line 9—9 in FIG. 8.
Figure 10:
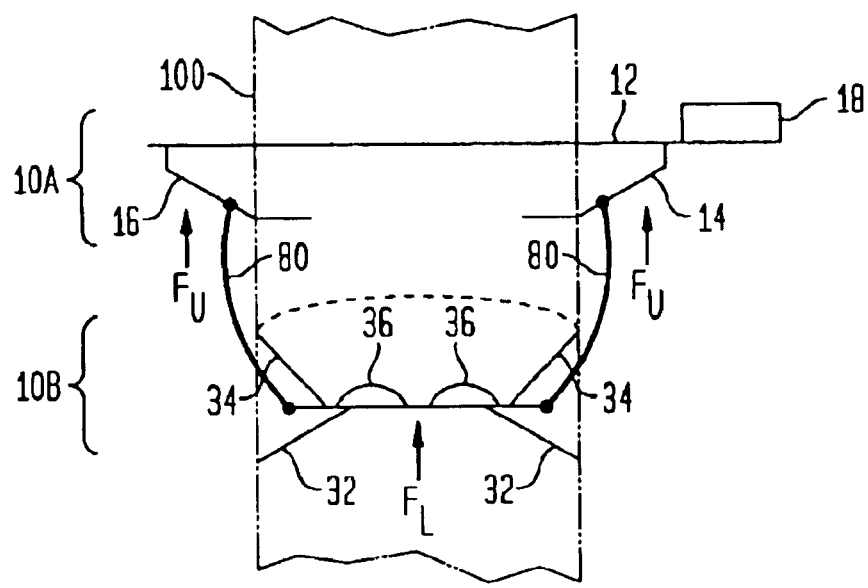
FIG. 10 is a schematic side view of the stand configured for climbing a columnar member.

When upper portion 10A is to be positioned at a height greater than the overhead reach of a user, climbing of upper portion 10A can be accomplished using lower portion 10B in conjunction therewith. Referring additionally to FIG. 10, it will be assumed that upper portion 10A is constructed as shown in FIGS. 8 and 9. Lower portion 10B is positioned with platform/footrest 30 positioned centrally between frames 14 and 16 so that a user standing on platform/footrest 30 can place one hand on frame 14 and one on frame 16 in order to apply upward force $F_U$ thereto as described above. A tether line 80 couples each of frames 14 and 16 to lower portion 10B.

In operation, a user will position lower portion 10B such that the user can squat on platform/footrest 30 and reach frames 14 and 16 for applying upward force $F_U$ thereto. The user can then stand up on platform/footrest 30 while pushing upper portion 10A up columnar member 100. When the user can reach no further, upward force $F_U$ is removed and upper portion 10A engages columnar member 100. The user then supports his weight using (e.g., hangs from) upper portion 10A while lifting lower portion 10B up columnar member 100 (towards upper portion 10A) by applying lifting force $F_L$ to platform/footrest 30. Stirrups 36 can be used to facilitate the application of lifting force $F_L$. Tether lines 80 serve as a safety should the user's feet slip out of stirrups 36 while applying lifting force $F_L$. With lower portion 10B positioned closer to upper portion 10A, the user can repeat the climbing steps until a desired height is reached.

The advantages of the present invention are numerous. By allowing a user to orbit about a columnar member safely and easily, one need not contort his body to achieve a proper view and/or working position. The present invention will be of great utility to hunters as well as providing a suitable work station for utility workers or a suitable lookout station for firefighters checking for forest or wild fires. In terms of the climbing embodiments of the present invention, the stand is easily worked up or down a columnar member while automatically adjusting to changing diameter of the columnar member as would be the case when the stand is to be used as a tree stand.

Figure 11:
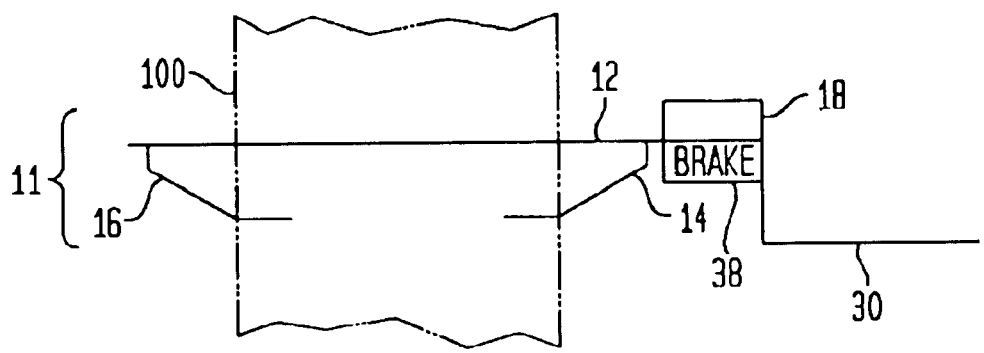
FIG. 11 is a schematic view of another embodiment of a stand that is permanently mounted to a columnar member while providing the user the capability to orbit about the columnar member in accordance with the present invention.

Although the invention has been described relative to a specific embodiment thereof, there are numerous variations and modifications that will be readily apparent to those skilled in the art in light of the above teachings. For example, as illustrated in FIG. 11, a stand 11 could be permanently mounted to columnar member 100. As described above, track 12 can be constructed to substantially or completely encircle columnar member 100, while seat 18 and platform/footrest 30 could be fixedly coupled to one another. Seat 18 could be equipped with a manually-operated brake 38 (such as that shown in FIG. 6) that locks seat 18 to track 12. When seat 18 is to be moved, the brake is released by the user sitting on seat 18. The user can then use track 12 to pull himself on seat 18 to a new position on track 12 at which point brake 38 can be reset. It is therefore to be understood that, within the scope of the appended claims, the invention may be practiced other than as specifically described.

What is claimed as new and desired to be secured by Letters Patent of the United States is:

1. A stand for use with a columnar member, comprising:
a track;
first mounting means coupled to said track and adapted to be secured to and encircle a columnar member, wherein said track is adapted to at least substantially encircle the columnar member, said first mounting means comprising (i) a first portion adapted to be disposed on one side of the columnar member, (ii) a second portion adapted to be disposed on another side of the columnar member and opposing said first portion, and (iii) means for biasing said first portion towards said second portion wherein the columnar member is adapted to be gripped therebetween;
a seat mounted to said track for movement thereon about the columnar member;
a platform; and
second mounting means coupled to said platform for mounting said platform to the columnar member beneath said seat, said second mounting means equipped to prevent movement thereof about the columnar member when a downward force is applied to said platform and allow movement thereof about the columnar member when a lifting force is applied to said platform.

2. A stand as in claim 1 further comprising locking means attached to said seat for fixing said seat relative to said track wherein movement of said seat on said track is impeded.

3. A stand as in claim 2 wherein said locking means couples said seat to one of said second mounting means and said platform.

4. A stand as in claim 1 wherein said track comprises a plurality of track sections joinable together to form said track.

5. A stand as in claim 1 wherein a user is adapted to sit on said seat and rest his feet on said platform, said platform further comprising means for engaging the feet of the user to facilitate generation of said lifting force with the user's feet.

6. A stand as in claim 1 wherein said track is continuous.

7. A stand as in claim 1 wherein said track is circular.

8. A stand as in claim 1 wherein said track comprises two parallel rails coupled to one another in a substantially horizontal plane, and wherein said seat is mounted to each of said two parallel rails.

9. A stand for use with a columnar member, comprising:
a continuous track;
first mounting means coupled to said track and adapted to be secured to and encircle a columnar member, wherein said track is adapted to encircle the columnar member, said first mounting means comprising (i) a first portion adapted to be disposed on one side of the columnar member, (ii) a second portion adapted to be disposed on another side of the columnar member and opposing said first portion, and (iii) means for biasing said first portion towards said second portion wherein the columnar member is adapted to be gripped therebetween;
a seat mounted to said track for movement thereon about the columnar member;
a platform;
second mounting means coupled to said platform for mounting said platform to the columnar member beneath said seat, said second mounting means equipped to prevent movement thereof about the columnar member when a downward force is applied to said platform and allow movement thereof about the columnar member when a lifting force is applied to said platform; and
locking means attached to said seat for fixing said seat relative to said track wherein movement of said seat on said track is impeded.

10. A stand as in claim 9 wherein said locking means couples said seat to one of said second mounting means and said platform.

11. A stand as in claim 9 wherein said track comprises a plurality of track sections joinable together to form said track.

12. A stand as in claim 9 wherein a user is adapted to sit on said seat and rest his feet on said platform, said platform further comprising means for engaging the feet of the user to facilitate generation of said lifting force with the user's feet.

13. A stand as in claim 9 wherein said track is circular.

14. A stand as in claim 9 wherein said track comprises two parallel rails coupled to one another in a substantially horizontal plane, and wherein said seat is mounted to each of said two parallel rails.

15. A stand for use with a columnar member, comprising:
a plurality of track sections joinable together to form a continuous track;
a first mounting frame coupled to a portion of said plurality of track sections and adapted to be disposed on one side of a columnar member for positioning said portion partially around the columnar member;
a second mounting frame coupled to a remainder of said plurality of track sections and adapted to be disposed on another side of the columnar member opposing said first mounting frame, said second mounting frame adapted to position said remainder partially around the columnar member;
said portion of said plurality of track sections being joined to said remainder of said plurality of track sections to form said track that is adapted to encircle the columnar member;
means for biasing said first mounting frame towards said second mounting frame wherein the columnar member is adapted to be gripped therebetween;
a seat mounted to said track for movement thereon;
a footrest;
footrest mounting means coupled to said footrest and adapted to be secured to the columnar member beneath said seat, said footrest mounting means preventing movement thereof about the columnar member when a downward force is applied to said footrest and allowing movement thereof about the columnar member when a lifting force is applied to said footrest; and
locking means attached to said seat for fixing said seat relative to said track wherein movement of said seat on said track is impeded.

16. A stand as in claim 15 wherein said locking means couples said seat to one of said footrest mounting means and said footrest.

17. A stand as in claim 15 wherein a user is adapted to sit on said seat and rest his feet on said footrest, said footrest further comprising means for engaging the feet of the user to facilitate generation of said lifting force with the user's feet.

18. A stand as in claim 15 wherein said track is circular.

19. A stand as in claim 15 wherein said track comprises two parallel rails coupled to one another in a substantially horizontal plane, and wherein said seat is mounted to each of said two parallel rails.

20. A stand as in claim 15, wherein said footrest mounting means with said footrest coupled thereto is adapted to support the weight of a user thereon, and wherein said means for biasing includes means, operable by the user supported on said footrest, for facilitating up or down movement of said first mounting frame and said second mounting frame with said track adapted to encircle the columnar member.

21. A stand as in claim 20 further comprising tethering means coupling each of said first mounting frame and said second mounting frame to said footrest mounting means when said first mounting frame and said second mounting frame are being moved up or down on the columnar member.

* * * * *